United States Patent [19]
Kanayama et al.

[11] Patent Number: 4,500,806
[45] Date of Patent: Feb. 19, 1985

[54] THREE-PHASE FLAT COILS

[75] Inventors: Kenji Kanayama, Kariya; Hidekuni Sugi, Nagoya, both of Japan

[73] Assignee: Nippondenso Co., Ltd., Kariya, Japan

[21] Appl. No.: 481,949

[22] Filed: Apr. 4, 1983

[30] Foreign Application Priority Data

Apr. 5, 1982 [JP] Japan .................. 57-57041

[51] Int. Cl.³ .................. H02K 3/00
[52] U.S. Cl. .................. 310/198; 310/207; 310/268
[58] Field of Search .......... 310/198, 71, 208, 180, 310/184, 156, 268, DIG. 6, 43, 45; 322/90; 318/495, 497

[56] References Cited

U.S. PATENT DOCUMENTS

| | | | |
|---|---|---|---|
| 3,231,774 | 1/1966 | Henry-Baudot | 310/268 |
| 3,456,144 | 7/1969 | Henry-Baudot | 310/268 |
| 3,480,815 | 11/1969 | Knapp | 310/205 |
| 3,953,751 | 4/1976 | Merkle | 310/156 |

FOREIGN PATENT DOCUMENTS

| | | | |
|---|---|---|---|
| 659117 | 12/1963 | Italy | 310/268 |
| 364026 | 10/1962 | Switzerland | 310/DIG. 6 |
| 364042 | 10/1962 | Switzerland | 310/DIG. 6 |

*Primary Examiner*—R. Skudy
*Attorney, Agent, or Firm*—Cushman, Darby & Cushman

[57] ABSTRACT

There is provided a three-phase flat coil having a disc-like outer periphery of an insulating plate and an electrical conductor positioned radially on front and back sides of said insulating plate and having bent-over portions on outer and inner peripheries thereof. Said electrical conductors are the three-phase coil windings including a-phase, b-phase and c-phase windings each wound in a wave form in the same direction and terminating at output terminals on the outer periphery of said plate. The output terminals are located at substantially one point on the outer periphery of said plate. The ends of the b-phase winding at said output terminals are different in polarity from the ends of the a-phase and c-phase windings. Intersections of the said three-phase coil windings are collectively positioned at substantially one point on the outer periphery of said insulating plate. Said intersections are provided for in a bridging wiring member which three-dimensionally connects the respective a-phase, b-phase and c-phase coil windings. The bridging wiring member having the intersections is provided at substantially one point of the outer periphery of the insulating plate thereby rendering the manufacture and wiring arrangement much easier. Stacking said flat coils together is easily accomplished by removing the bridging wiring member from one coil and placing that coil on top of another coil with an insulating plate in between. The output terminals of the bottom coil can be directly connected to the correct winding in the coil above. All connections are located at the outer periphery of the disc coils.

4 Claims, 21 Drawing Figures

F I G. 9
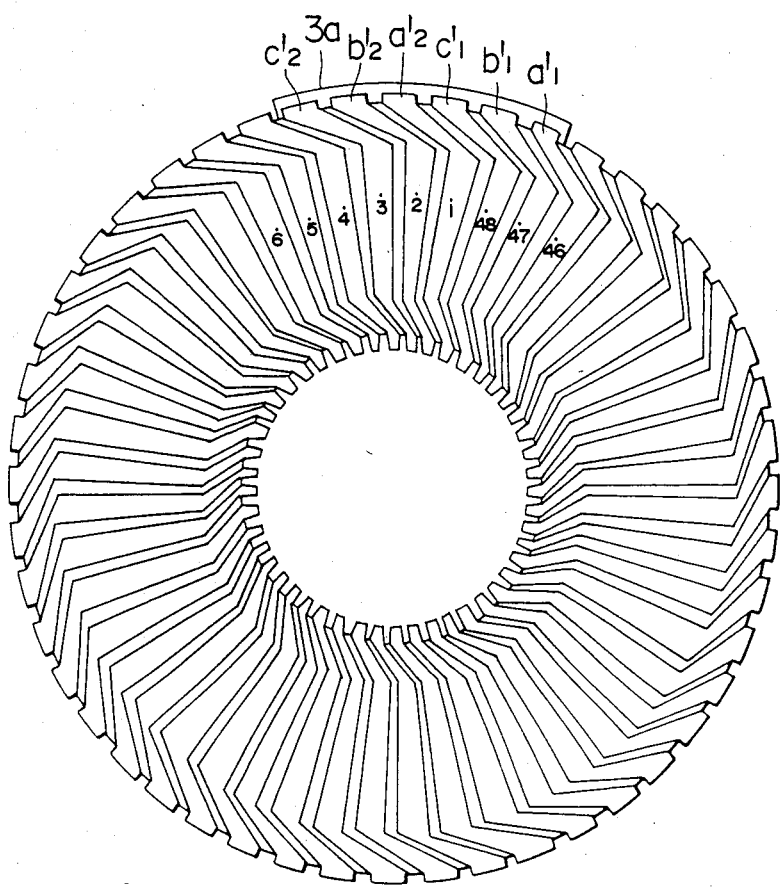

F I G. 11
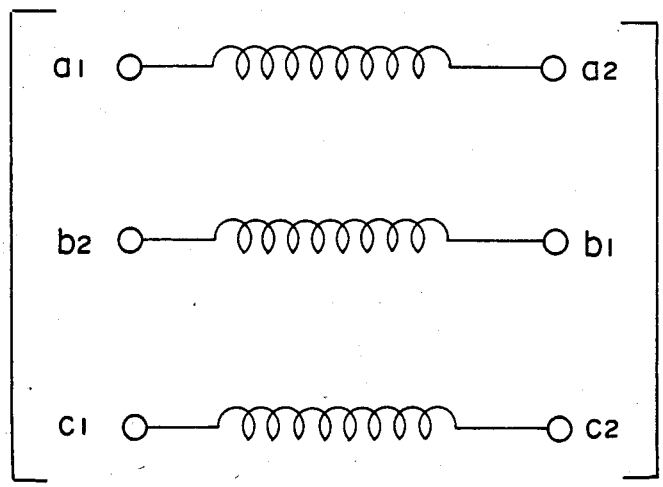
F I G. 12
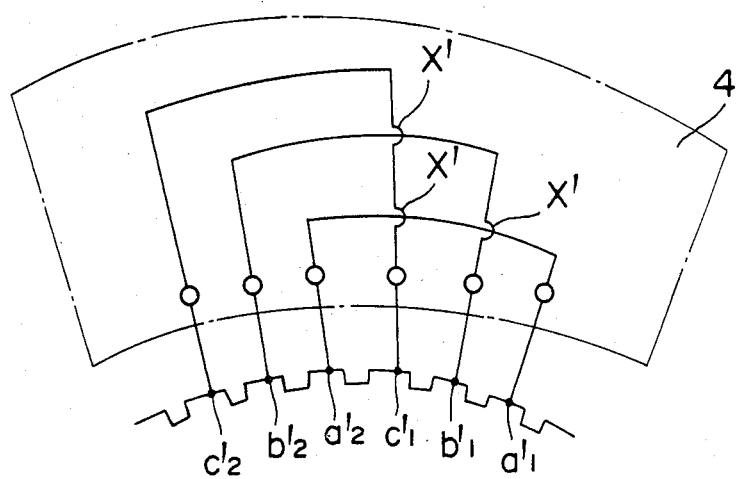

4,500,806

1

THREE-PHASE FLAT COILS

BACKGROUND OF THE INVENTION

This invention relates to a three-phase alternating current coil and particularly to a three-phase flat coil having flat coil windings for three-phase alternating current for use in, for example, a printed circuit motor or a three-phase alternator.

Hitherto, in three-phase alternating current coils, a coil winding for one has been wound in an opposite direction to that of the remaining two coil windings for simplifying the end treatment or working. FIG. 1 is a winding diagram of a conventional three-phase alternating current coil in which a coil winding for a phase b is wound in an opposite direction to coil windings for phases a and c to provide a close arrangement of their positive and negative terminals in the end treatment or working.

In order to provide a printed coil formed by such a conventional winding method as shown in FIG. 1, however, there are disadvantages that because of the opposite winding direction of the coil winding for the phase b this coil winding intersects the coil windings for phases a and c at portions X, and thus electrical insulation has to be provided at the portions X.

Specifically, references 1 to 12 shown in FIG. 1 designate coil portions. When printed coils are employed slots or groves for containing the coils are not required, which is different from devices with ring like cores. For simplification, however, the disposition of coil portions corresponding to the numbers 1 to 12 will be refered to as slot numbers hereinbelow.

Typically, printed coils are arranged in a circular disc configuration as shown in FIG. 8. However, FIG. 1 illustrates the printed coil schematically in an elongated arrangement to simplify understanding. Therefore, a line $L_1$—$L_2$ shows an outer periphery of an effective area of the disc-like printed coil, and a line $L_3$—$L_4$ shows an inner periphery of the effective area of the coil.

In FIG. 1, a coil portion P1 is provided on a front side of the disc-like winding and loops around at the inner periphery thereof so that a portion P2 extends on a back side of the disc.

In this way, portions P3 and P4 are also provided on the front side of the disc-like winding, and portions P5 and P6 are on the back side thereof.

In this case, a coil portion P7 disposed at a noneffective area on the inner periphery is on the front side, and a portion P8 is on the back side. A portion P9 is on a boundary between the front and back sides and passes through an inner periphery $L_5$ of the disc of FIG. 8.

As described above, there are portions provided on the front and back sides. In FIG. 1, the portions provided on the front side are referred to by (O), and the portions provided on the back side are also referred to by (B).

It is thus apparent that there are intersections X at which two front winding portions intersect with each other or two back winding portions intersect with each other. Such portions have to be formed in three-dimensional intersections to provide electrical insulation therebetween, but such insulation is difficult and the size is become large and bulky.

2

Moreover, the wiring arrangement of FIG. 1 must have the intersections X dispersed throughout the inner and outer peripheries of the printed coil.

To solve this problem, it is possible to use a winding (magnet wire) having an insulating coating thereon, but this will render the intersections thick in size and make it impossible to manufacture a thin, flat printed coil.

To overcome these problems, the present invention provides a three-phase flat coil in which such intersections are minimized and the reduced intersections are collectively provided at substantially one point or in a far smaller area. The intersections have a solid and firm insulating construction to allow easy manufacture. To increase the output, a plurality of coil discs may be overlapped in layers. Easy connections are provided between the coil discs to simplify manufacturing.

In one aspect of the present invention, a three-phase flat coil includes coil portions each having output terminals constituting winding-in and winding-out portions on an outer periphery of an insulating plate and an electrical conductor positoned radially on front and back sides of said insulating plate and having bent-over portions on outer and inner peripheries thereof. Three-phase coil windings including a-phase, b-phase and c-phase windings are each wound in a wave form in the same direction. Ends of the b-phase winding at the output terminals are different in polarity from ends of the a-phase and c-phase windings to form an aggregation of the coil portions. A bridging wiring member, including all necesssary intersections, is provided for the three-phase coil windings. The intersections are and collectively positioned at substantially one point of the outer periphery of said insulating plate. In the bridging wiring member these intersections three-dimensionally intersected with one another and the windings are connected to the respective a-phase, b-phase and c-phase coil windings. Therefore, the bringing wiring member having the intersections is not located on the inner periphery of the insulating plate and is not disposed dispersedly on a plurality of points of the peripheries thereof. Instead, the member is collectively provided only at substantially one point of the outer periphery of the insulating plate thereby rendering the manufacture and wiring arrangement much easier.

Thus the present invention provides a three-phase coil in a generally flat and thin form, even if the size of the bringing wiring member is increased.

As a result of these features the air gap or the like of the magnetic circuit of a rotary electric machine, incorporating a three-phase thin and flat coil according to the present invention is reduced to minimize the magnetic resistance and increase the output.

BRIEF DESCRIPTION OF THE DRAWINGS

FIG. 9 is a rear view of the coil of FIG. 8;

FIG. 11 is a diagrammatic representation of the coil in the finished condition of FIG. 10;

FIG. 12 is a practical wiring diagram of a bridging wiring member area to be assembled with the coil of FIG. 10;

DETAILED DESCRIPTION OF THE EMBODIMENT

Figure 1:
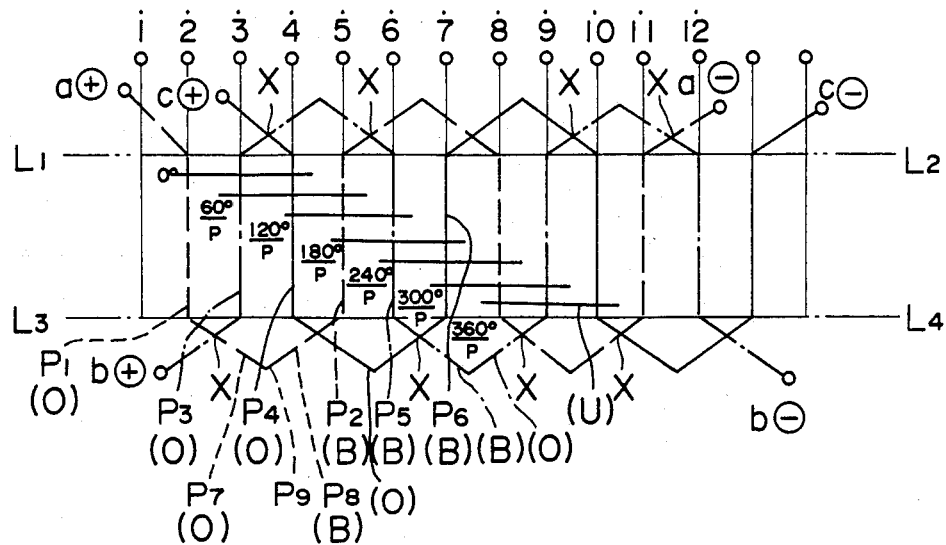
FIG. 1 is a schematic illustration of a winding arrangement of a conventional three-phase coil.
Figure 2:
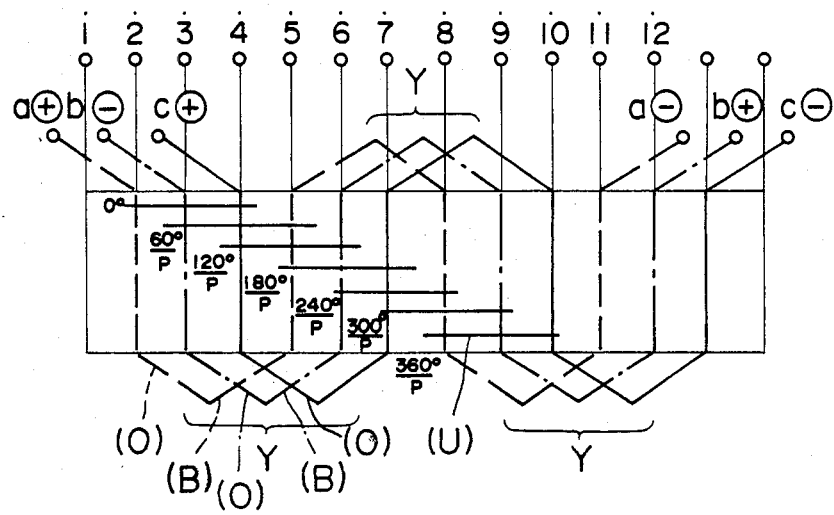
FIG. 2 is a schematic illustration of the principle of a winding arrangement of a three-phase coil in accordance with the present invention.

FIG. 2 is a schematic illustration similar to that of FIG. 1 and shows a winding arrangement of the present invention.

The arrangement of FIG. 2 has a b-phase winding wound in the opposite direction to that of the b-phase winding of FIG. 1, and a-phase, b-phase and c-phase windings are all wound in the same direction in a wave form. Instead, the polarity of the ends of the b-phase coil winding is reversed so that the direction of flow of current through the b-phase winding of FIG. 2 is opposite to the direction of flow of current through the b-phase winding of FIG. 1. In the drawings, the references + and − designate positive and negative polarities, respectively.

In other words, the phase of the b-phase winding of FIG. 2 is deflected by an angle of 180° from the phase of the b-phase winding of FIG. 1. In order to remove this deflection of phase, the positive and negative polarities of the ends of the b-phase winding are changed to each other so that the same phase condition can be established by changing the end b+ of the b-phase winding of FIG. 1 to the end b− of the b-phase winding of FIG. 2.

Figure 3:
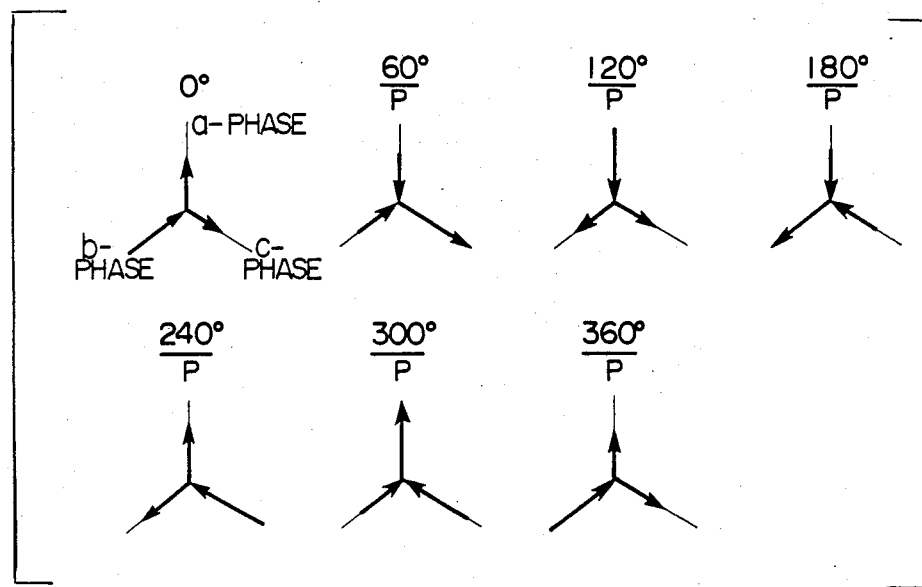
FIGS. 3 and 4 are vector diagrams showing the generating conditions of electromotive forces in the three-phase coils of FIGS. 1 and 2.
Figure 4:
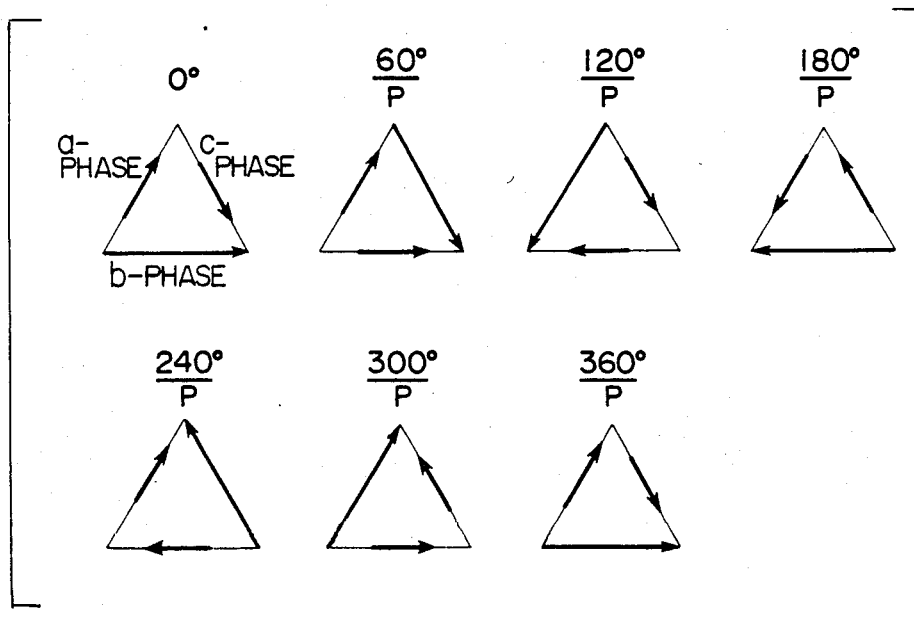

The electromotive forces generated in a three-phase alternator are shown in FIG. 3 in the case of star connection and in FIG. 4 in the case of delta connection. In FIGS. 1 and 2, a reference (U) designates a pole of N- or S-polarity of the magnetic field and moves through the slots at angles of 0°, 60°/P, 120°/P, . . . 360°/P, where P designates a number of pole pairs.

FIGS. 3 and 4 show the directions of generation of the electromotive forces at the individual angles in the a-phase, b-phase and c-phase coil windings. (In FIG. 3, outward arrows designate currents from positive to negative, and in FIG. 4 clockwise arrows designate currents from positive to negative.)

In the conventional windings of FIG. 1, the electromotive forces are generated as shown in FIG. 3 in the case of star connection, and as shown in FIG. 4 in the case of delta connection. The windings of FIG. 2 used with the present invention also generate the same electromotive forces as shown in FIG. 3 in the case of star connection and as shown in FIG. 4 in the case of delta connection.

In the winding system of FIG. 2, apparent intersections are caused in portions Y. However, all the intersections are formed on the front and back sides of the coil portions as referred to by (O) and (B), respectively. Therefore, it is not necessary that the portions Y are provided with additional insulation interposed between the coil portions.

In the windings shown in FIGS. 1 and 2, a part of the slots positioned on the front and back sides of the disc-like flat coil is not used. For example, the portions of the slot numbers 2, 3 and 4 are provided with coil portions only on their front side, and no coil portion is provided on the back side of the disc-like coil corresponding to the slot numbers 2, 3 and 4. In the portions of the slot numbers 5, 6 and 7, only the back side is utilized.

Such a winding system, which uses only either the front or back side, is very inefficient. Therefore, the coil of the present invention has windings shown in FIG. 5.

Figure 5:
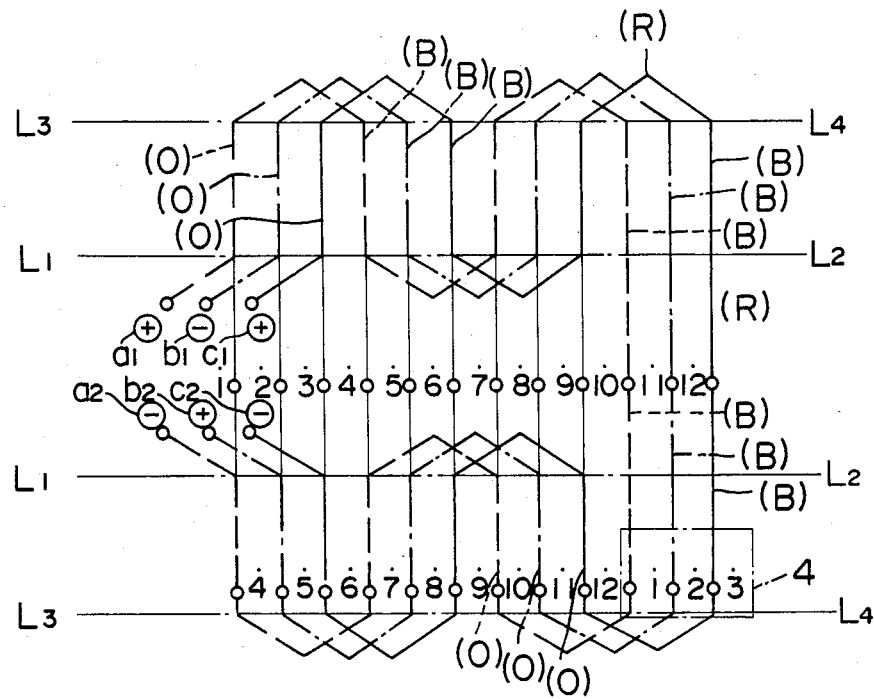
FIG. 5 is a schematic illustration of a first embodiment of the three-phase flat coil in accordnace with the present invention.

The coil of FIG. 5 is a first embodiment of the present invention and has twelve slots which all have conductors. The number of the pole pairs P is two in this case.

In FIG. 5, references $a_1$, $b_1$, $c_1$, $a_2$, $b_2$ and $C_2$, designate output terminals, and $\oplus$ and $\ominus$ designate the polarity, and (R) designates a transition portion between front and back.

In this FIG. 5, furthermore, the coil portion positioned on the front side of the disc-like flat coil is referred to by (O), and the portion positioned on the back side is referred to by (B). The lines $L_1$–$L_2$ and $L_3$–$L_4$ designate the outer and inner peripheries, respectively, of the disc-like coil.

As will be apparent from FIG. 5, coil portions are provided on the front and back sides of slot numbers 10, 11 and 12, but electrical connection should be provided from the back side of the slot numbers 10, 11, and 12 to the back side of the slot numbers 1, 2 and 3.

Figure 6:
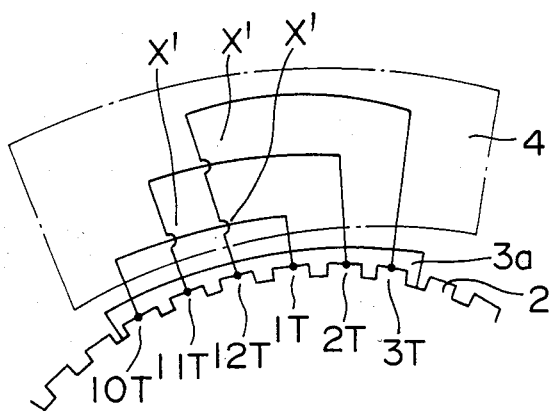
FIG. 6 is a wiring diagram of a bridging wiring member area of the three-phase coil of FIG. 5.

Among the slots . . . 7, 8, 9, 10, 11, 12, 1, 2, 3, 4, 5, 6 . . . positioned circumferentially along the outer periphery of the disc-like coil, three electrical connections for a-phase, b-phase, and c-phase windings should be made slots 10, 11 and 12 to the slots 1, 2, and 3 and should be made through three three-dimensional intersections X' as diagrammatically shown in FIG. 6, wherein the coil portions are mutually insulated. In FIG. 6, references 1T, 2R, 3T, 10T, 11T and 12T designate bridging terminals provided on the outer periphery of the coil portions connected to the coil portions positioned in the slot numbers 1, 2, 3, 10, 11 and 12, respectively, and 2 is a coil portion and 3a is a projection of the insulating plate.

Therefore, the coil of the present invention has the intersections X' but they are reduced in number and collectively provided substantially at one point of the outer periphery of the disc-like coil. The intersections X' are shown as a bridging wiring portion 4 in FIG. 5.

It is, therefore, apparent that the construction of FIG. 6 is much more simple than that of FIG. 1 wherein a larger number of intersections are required on both the inner and outer peripheries.

Figure 7:
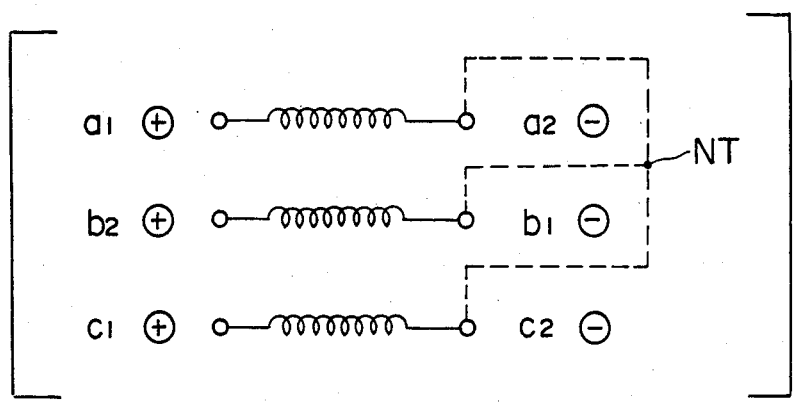
FIG. 7 is a wiring diagram of the coil in star connection of FIG. 5.

FIG. 7 is a more diagrammatical and simple representation of the wiring diagram of FIG. 5. For example, the dotted lines are added as bridging lines to form a neutral output terminal (NT). The terminals $a_1$, $b_1$, and $c_1$ are provided as three-phase alternating current output terminals to form a three-phase flat coil having star connection usable as an armature coil for a three-phase alternator.

The second embodiment will now be described.

Figure 8:
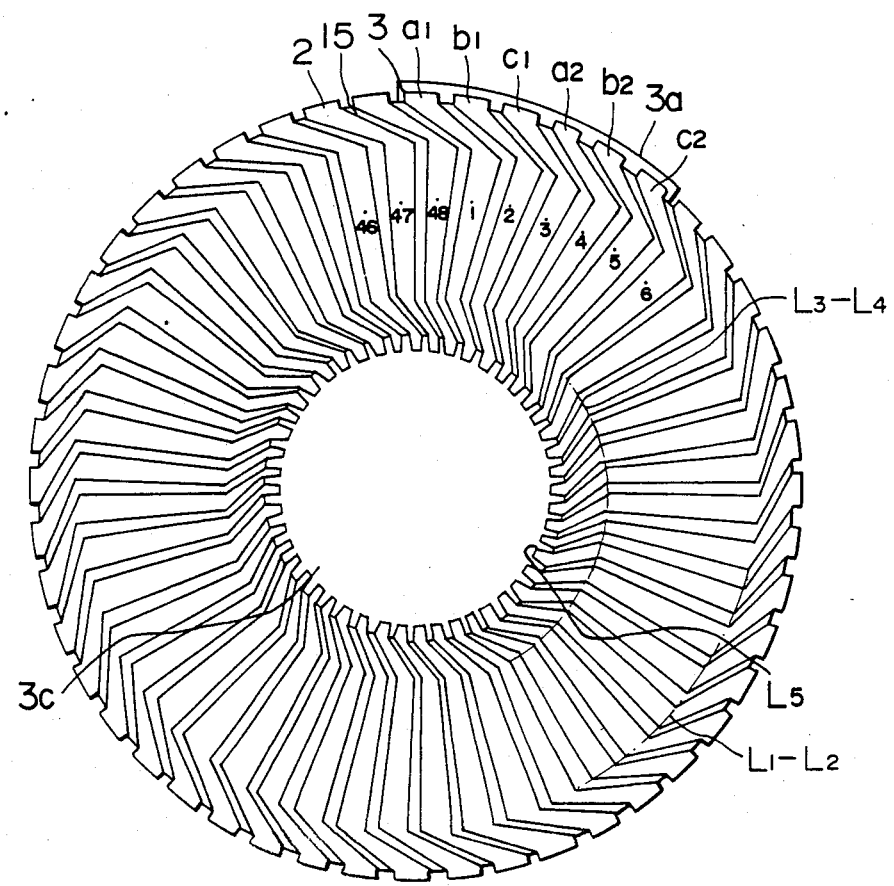
FIG. 8 is a front view of a second embodiment of the coil of the present invention just before the finished-product thereof.

This embodiment has eight pole pairs and forty eight slots and is shown in FIG. 8 in a front view and in FIG. 9 in a back view.

As will be apparent from these figures, no such a bridging wiring portion 4 with the tersections as is shown in FIG. 5 is provided in the printed coil of FIGS. 8 and 9.

Figure 10:
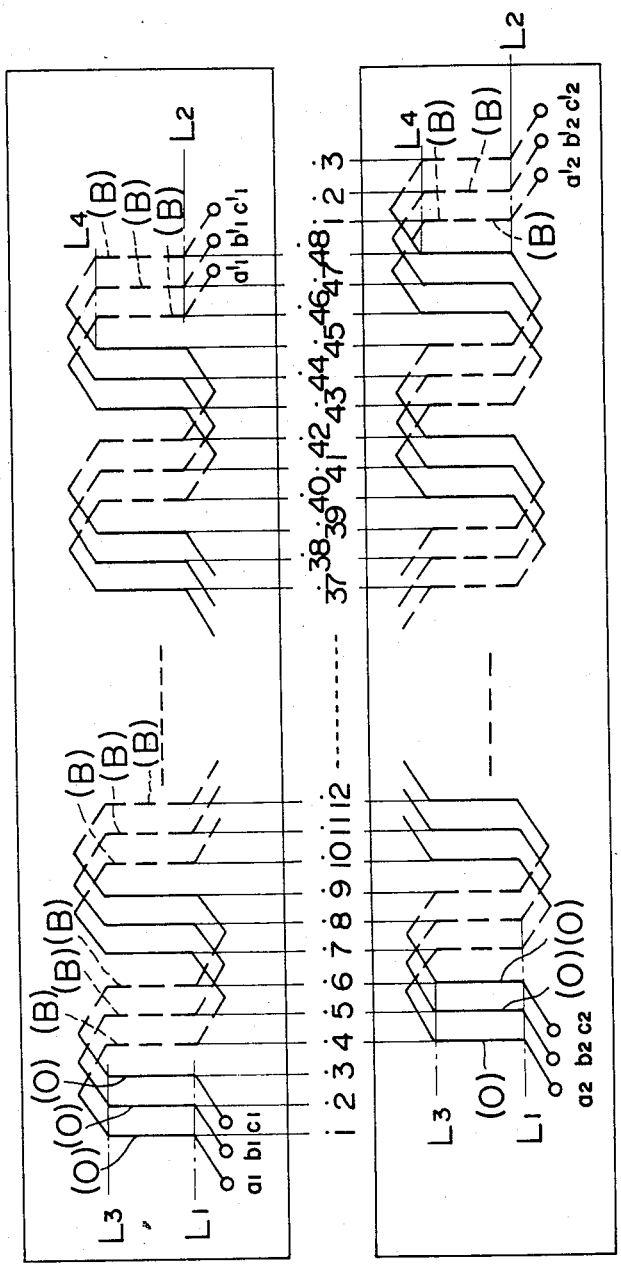
FIg. 10 is a schematic illustration of the second embodiment of the coil.

FIG. 10 is a development of the printed coil having eight pole pairs and forty eights slots but having no bridging wiring portion.

In FIG. 10, references 1 to 48 are slot numbers. In order to form a three-phase coil as diagrammatically shown in FIG. 11 from the coil of FIG. 10, it is necessary to make an electrical connection via a bridging wiring portion similar to the coil of FIG. 5. Terminals $a_1'$, $b_1'$ and $c_1'$ are connected to coil portions on the back side of the slots 46, 47 and 48 of FIG. 10 and terminals $a_2'$, $b_2'$ and $c_2'$ are connected to coil portions on the back side of the slots 1, 2 and 3 by a bridging wiring portion.

FIG. 12 is a diagrammatic representation of such bridging wiring portion 4.

The construction of the coil of FIGS. 8 and 9 will be described below.

FIGS. 8 and 9 show front and back sides of a single layered three-phase flat coil. In these drawings, 2 designates coil portions particularly made of copper strips, and 3 designates an insulating resin plate, such as a mica plate or an insulating resin plate, having an opening 3c at its center portion. The copper strips 2 are made in the same shape and welded on the front and back sides across the insulating plate 3, and gaps between adjacent copper strips 2 are filled with an insulating silicone resin material 15 to fix the strips 2, thereby forming a three-phase alternating current coil.

3a is a part of the insulating plate 3 slightly projecting outwardly from the outer periphery. Provided adjacent to this projecting portion 3a of the insulating plate is a bridging wiring member 4 shown in FIG. 12.

A three-phase alternator incorporated as an armature coil with the three-phase flat coil of the second embodiment in which the coil portions are provided in all the slots of the front and back sides and which has eight pole pairs P and forty eight slots will be described by referene to FIGS. 13 to 16.

Figure 13:
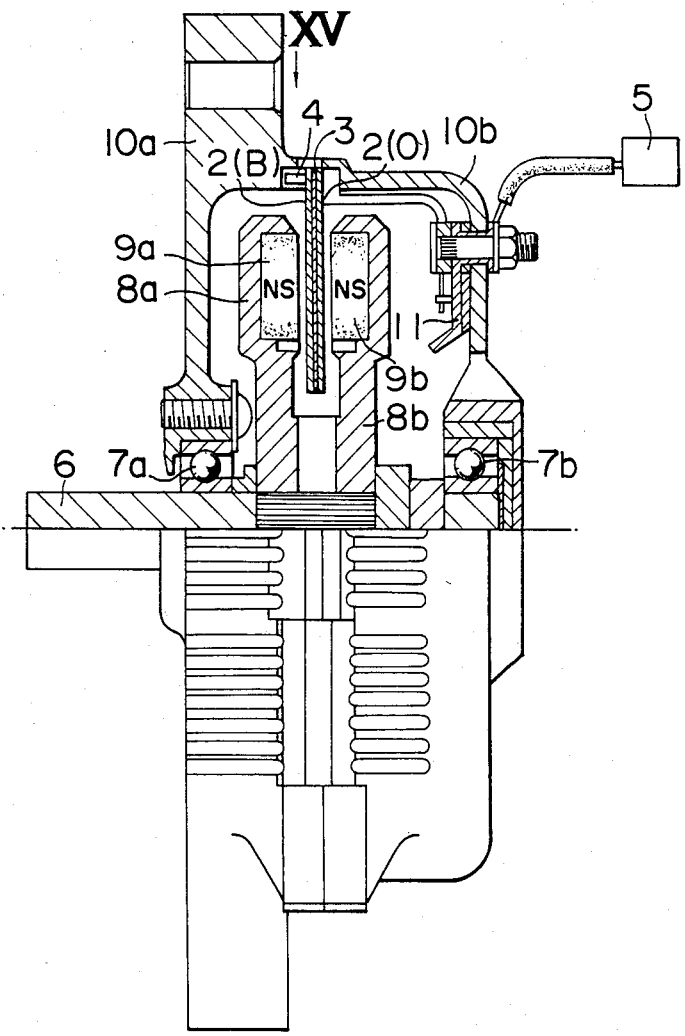
FIG. 13 is a part-sectional view of a three-phase alternator incorporated with the second embodiment of the coil.

In FIG. 13, 2 designates copper strips on the front and back sides of the printed coil to constitute coil portions, 3 being an insulating plate for insulating the copper strips on the front and back sides, and the three-phase flat coil of the present invention being mainly formed by the strips 2 and the plate 3. 4 designates a bridging wiring member constituting a single intersecting portion which corresponds to the portion diagrammatically shown in FIG. 12.

5 is a connector, 6 is a shaft rotatably supported by bearings 7a and 7b. 8a and 8b are rotors fixed to the shaft 6, and 9a and 9b are permanent magnets incorporated in the rotors 8a and 8b. 10a and 10b are housing portions and 11 is a known thyrister bridge for commutating the three-phase current.

Figure 14:
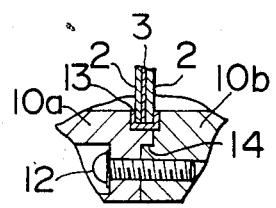
FIG. 14 is a fragmentary section of a part of a housing of the alternator of FIG. 13.

FIG. 14 is a section showing a fitted portion between the front and rear housing portions 10a and 10b, and 14 is the fitted portion, 12 is a fixing throughbolt, and 13 is an insulating plate for holding the coil portions 2.

Figure 15:
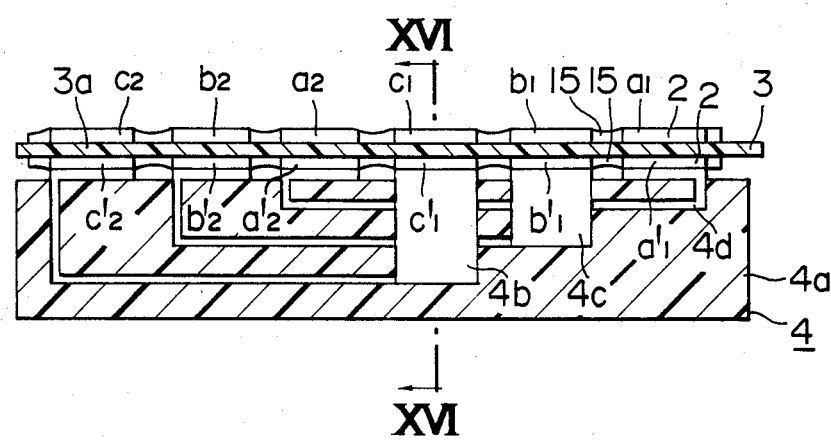
FIG. 15 is a section of the bridging wiring member as viewed in a direction of an arrow XV of FIG. 13.
Figure 16:
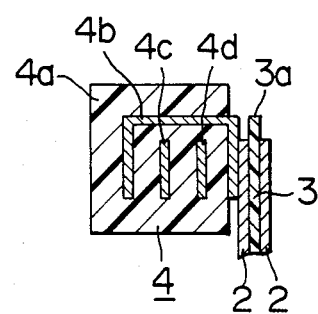
FIG. 16 is a section taken along a line XVI—XVI of FIG. 15.

FIGS. 15 and 16 are sectional views showing in greater detail the bridging wiring member 4 constituting the single intersection portion of FIGS. 12 and 13; and FIG. 15 is as viewed in the direction of the arrow XV of FIG. 13, and FIG. 16 is a section taken along the line XVI—XVI of FIG. 15. The references designating the terminals in FIG. 15 are same as those shown in FIG. 12.

In FIG. 15, 15 is an insulating silicone resin material for fixing the copper strips 2, and 4a is an insulating member, such as an insulating resin or ceramic, and 4b, 4c and 4d are connecting copper webs or bus bars made of a metal.

The bridging wiring member 4 having the intersecting portion is located within the front housing portion 10a as shown in FIG. 13.

The third embodiment of the invention will be described below.

The third embodiment is made by overlapping a plurality of disc-like flat coils having such an outer configuration as shown in FIGS. 8 and 9 to generate an increased output.

The third embodiment is described with the aid of FIGS. 8, 9 and 10 which shows the second embodiment.

Figure 17:
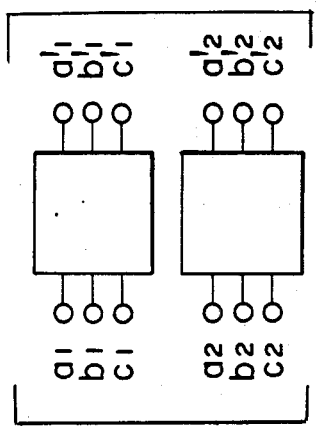
FIG. 17 is a simple and diagrammatic representation of electrical connection of the winding of FIG. 10.

It has been described hereinbefore that the wiring diagram of the single disc-like coil of FIGS. 8 and 9 can be shown by FIG. 10. A more simplified representation of the circuit of FIG. 10 is seen in FIG. 17.

Figure 18:
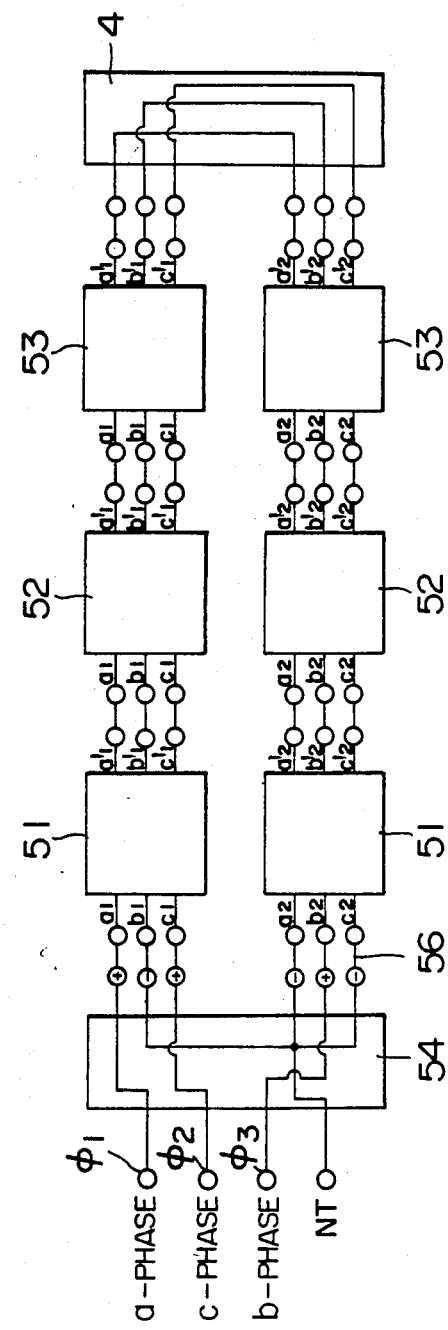
FIG. 18 is a diagrammatic representation of electrical connection of a multi-layered three-phase coil with increased windings, which is a third embodiment of the present invention.

Therefore, if three discs as shown in FIGS. 8 and 9 are overlapped with and electrically connected in series to one another, the connection will be as shown in FIG. 18. As will be apparent from this figures, each of the discs has six output terminals $a_1$, $b_1$, $c_1$, $a_2$, $b_2$, and $c_2$ and six bridging terminals $a_1'$, $b_1'$, $c_1'$, $a_2'$, $b_2'$ and $c_2'$, and those terminals are all positioned substantially at one point of the outer periphery of the disc, i.e., on the front and back sides of the projecting portion of the insulating plate.

In order to connect the three discs in series, therefore, the output terminals $a_1$, $b_1$, $c_1$ of the first disc 51 are connected as the output of the three-phase coil to the output line member 54 through output wiring 56, and the bridging terminals $a_1'$, $b_1'$, . . . $c_2'$ of the first disc 51 may be connected to the output terminals $a_1$, $b_1$, . . . $c_2$ of the second disc 52.

In this case, the bridging terminals $a_1'$, $b_1'$, . . . $c_2'$ of the first disc-like coil and the output terminals $a_1$, $b_1$, . . . $c_2$ are located back to back and connected as shown in FIG. 20 described hereinlater.

Figure 19:
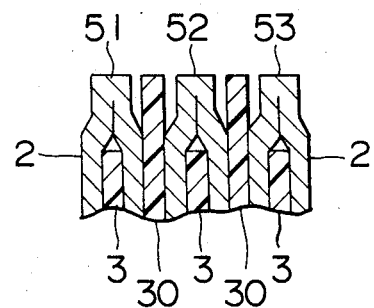
FIGS. 19 to 21 show the construction of the third embodiment, FIG. 19 being a section taken along a line XIX—XIX of FIG. 21, FIG. 20 being a fragmentary section taken along a line XX—XX of FIG. 21, and FIG. 21 being a section similar to that of FIG. 15 and showing the bringing wiring member area.
Figure 21:
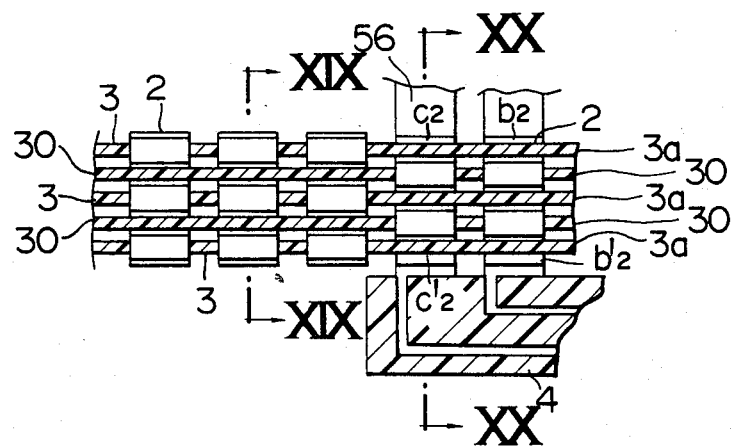

FIG. 19 is a section (taken along the line XIX—XIX of FIG. 21) of a part of a multi-layered disc-like coil formed of three coil discs overlapped. 51, 52 and 53 are first, second and third discs, respectively.

Figure 20:
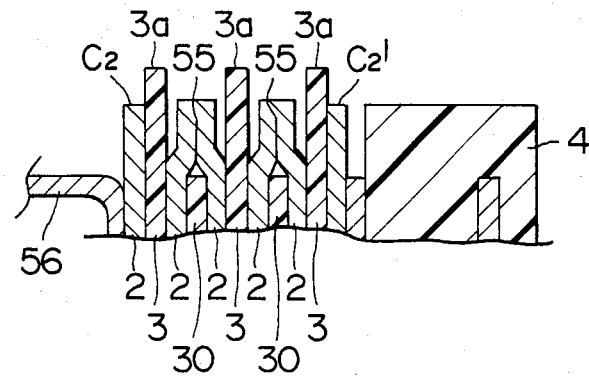

FIG. 20 is a section (taken along the line XX—XX of FIG. 21) of the projecting portions 3a of the insulating plates of the multi-layered disc-like coil.

In FIG. 20, $c_2$ is an output terminal of the first disc, and $c_2'$ is a bridging terminal of the third disc 53 and connected to the bridging wiring member 4. 55 are spot-welded portions to which the coil portion 2 on the front and back sides of the insulating plate 3 are connected. 30 are inter-layer insulating members which may be made of the same material as that of the insulating material 3, but are different in shape from the latter. Namely, as shown in FIGS. 19 and 20, the inter-layer insulating members 30 are depressed at the position in which the projecting portions 3a of the insulating plates 3 are projected.

As described above, by overlapping a plurality of coil discs and electrically connecting them in series, a relatively high voltage can be derived. Furthermore, use of this three-phase flat coil in a motor results in increase in the output thereof.

Although the example shown in FIG. 13 is a three-phase alternator, the coil of the present invention can be applied to a three-phase alternating current motor.

Furthermore, the three-phase flat coil of the present invention can be manufactured by pressing operation to form the copper strips followed by adhesion of a coper disc on the insulating plate to form a plurality of radially extending conductive strips. In other words, the plurality of radially extending copper strips 2 may be printed and formed by etching operation on the insulating plate 3 or by punching and pressing operation of a disc-like coper plate.

Moreover, the coil can be made by winding a magnet wire, then pressing and flattening it.

We claim:

1. A three-phase flat coil comprising:
   a disc-like insulating plate having an opening at its center portion;
   three-phase coil windings including a-phase, b-phase and c-phase windings, each wound in a wave form around said plate in the same direction, each of said windings including front and back portions extending on front and back sides, respectively, of said plate in a radial direction, selected front and back portions of said windings being connected by transition portions wrapped around inner and outer peripheries of said plate, the number of said transition portions being a multiple of three, each of said windings having a first half with a first end on said front side of said plate and a second end on said back side of said plate, and a second half with a first end on said front side of said plate and a second end on said back side of said plate;
   a plurality of output terminals disposed on the outer periphery of said front side of said plate, each connected to one of said first ends, respectively, ends of said b-phase winding at said output terminals being different in polarity from the ends of a-phase and c-phase windings at said output terminals; and
   bridging wiring means positioned at substantially one point on the outer periphery of said back side of said insulating plate for three-dimensionally interconnecting said second ends of each said a-phase, b-phase and c-phase coil winding, respectively.

2. A three-phase flat coil as set forth in claim 1, wherein a part of the outer peripheral portion of said insulating plate is radially projected to form a projecting portion for providing insulation between said front portions and said back portions of said windings where said output terminals and said bridging wiring means is disposed.

3. A three-phase flat coil as set forth in claim 1 or 2, wherein said second ends of said coils are disposed at the outer periphery of said plate and said bridging wiring means includes an insulating member and metal connecting members separated in a direction perpendicular to said plate by said insulating member.

4. An aggregation of three-phase flat coils comprising:
   a plurality of disc-like insulating plates, each having an opening at its center portion, said plates being stacked with center portions aligned;
   three-phase coil windings on each of said plates including a-phase, b-phase, and c-phase windings, each wound in a wave form around a corresponding one of said plates in the same direction, each of said windings including front and back portions extending on front and back sides, respectively, of a corresponding one of said plates in a radial direction, selected front and back portions of said windings being connected by transition portions wrapped around inner and outer peripheries of said corresponding plate, the number of said transition portions being a multiple of three, each of said windings having a first half with a first end on said front side of a corresponding one of said plates and a second end on said back side of said corresponding plate, and a second half with a first end on said front side of said corresponding plate and a second end on said back side of said corresponding plate;
   a plurality of output terminals disposed on the outer periphery of said front side of each of said plates, each connected to one of said first ends, respectively, and ends of the b-phase winding at said output terminals being different in polarity from the ends of the a-phase and c-phase windings, said output terminals of all but a first one of said plates being connected to said second ends of corresponding halves of said windings;
   inter-layer insulating members located between said plates; and
   bridging wiring means positioned at substantially one point of the outer periphery of said back side of a last of said plates for three-dimensionally interconnecting said second ends of each said a-phase, b-phase and c-phase coil windings, respectively, of said last plate.

* * * * *